United States Patent
Shaylor

(10) Patent No.: US 6,408,325 B1
(45) Date of Patent: Jun. 18, 2002

(54) CONTEXT SWITCHING TECHNIQUE FOR PROCESSORS WITH LARGE REGISTER FILES

(75) Inventor: Nik Shaylor, Newark, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/073,500

(22) Filed: May 6, 1998

(51) Int. Cl.[7] .............................................. G06F 9/00
(52) U.S. Cl. ...................................... 709/108; 712/228
(58) Field of Search ........................... 709/1, 107, 108; 712/23, 228, 229

(56) References Cited

U.S. PATENT DOCUMENTS

| 4,594,660 | A | | 6/1986 | Guenthner et al. | 364/200 |
|---|---|---|---|---|---|
| 5,021,993 | A | | 6/1991 | Matoba et al. | 364/900 |
| 5,349,680 | A | | 9/1994 | Fukuoka | 395/800 |
| 5,448,707 | A | * | 9/1995 | Hinton et al. | 712/228 |
| 5,812,868 | A | * | 9/1998 | Moyer et al. | 712/23 |
| 5,933,627 | A | * | 8/1999 | Parady | 711/141 |
| 5,966,529 | A | * | 10/1999 | Sollars | 395/569 |
| 5,974,512 | A | * | 10/1999 | Chiba | 711/162 |
| 6,128,728 | A | * | 10/2000 | Dowling | 712/228 |
| 6,223,208 | B1 | * | 4/2001 | Kiefer et al. | 709/108 |
| 6,233,599 | B1 | * | 5/2001 | Nation et al. | 709/102 |

FOREIGN PATENT DOCUMENTS

| EP | 0 285 310 | 10/1988 |
|---|---|---|
| EP | 0 373 790 | 6/1990 |

OTHER PUBLICATIONS

Cheng et al. The Compiler for Supporting Multithreading in Cyclic Register Windows, IEEE 1996.*
Keppel Register Windows and User–Space Threads on SPRAC 1991.*
Hidaka et al. Multiple Threads in Cyclic Register Windows 1993.*
Waldspurger et al. Register Relocation: Flexible Contexts for Multithreading 1993.*
McGeady et al, Performance Enhancements in Superscalar; 960MM Embedded Mienpoons, 1991.*
"Technique for Reducing the Number of Registers Saved at a Context Swap", IBM Technical Disclosure Bulletin, vol. 33, No. 3A, Aug. 1990, pp. 234–235.
Desai, S.M., "General Purpose Registers Extension", IBM Technical Disclosure Bulletin, vol. 24, No. 3, Aug. 1981, pp. 1404–1405.

* cited by examiner

Primary Examiner—Larry D. Donaghue
(74) Attorney, Agent, or Firm—Stuart T. Langley; William J. Kubida; Hogan & Hartson LLP

(57) ABSTRACT

A computer system and a method for operating a processor including the steps of establishing a first register save area and a second register save area in a memory, where each register save area holds data values that define a context. The first context is loaded in the processor by loading at least some of the data values from the first register save area into the plurality of registers. A first pointer value to the first register save area is stored in a current RFSA register. A context switch is indicated by storing a second pointer to the second register save area in the current RFSA register. The first pointer is transferred from the current RFSA register to a previous RFSA register. All of the data values that define the first context are transferred from the registers to a shadow register file. The second context is established in the processor by loading selected data values from the second register file save area into the plurality of registers.

22 Claims, 2 Drawing Sheets

CONTEXT SWITCHING TECHNIQUE FOR PROCESSORS WITH LARGE REGISTER FILES

BACKGROUND OF THE INVENTION

1. Field of the Invention

The present invention relates, in general, to data processors, and, more particularly, to a method, apparatus and system for implementing context switching in processors with large register files.

2. Relevant Background

Computer systems include central processing units (CPUs), microcontroller units (MCUs), and the like coupled with memory. Programs that run on such computer systems operate on data that may be stored and retrieved by the program or supplied at run-time. Programs include a plurality of saved instructions that define particular operations that are to be performed on the data.

Most processor architectures generally define a plurality of registers for holding the data to be operated on by the program instructions. These registers may be implemented as hardware registers or as register files in general purpose memory. The registers store both the instruction and data that are being or may be used by the processor. The registers are usually implemented in memory devices that are closely coupled with the processor to provide low-latency access to data required by the processor. The registers are typically defined in the processor architecture specification and so are usually considered part of the processor architecture even where they are physically implemented in another device.

High speed processors may have tens or hundreds of registers in a general register file. The large number of registers can enable the processor to process a large amount of data concurrently and to load or store data from longer latency storage before it is needed. Very long instruction word (VLIW) processors tend to have higher register number requirements because of the inherent parallelism of VLIW that results in more concurrent operations. The higher register number requirements place correspondingly higher bandwidth and response time requirements on the memory bus that transfers data between memory and the registers. It can take multiple memory bus clock cycles to transfer data into or remove data from all the available registers in a processor.

As a more specific example, multi-tasking and multi-threading processor architectures enhance data processing efficiency in many applications. In such architectures, software programs executing on the processor are segmented into atomic "threads" that execute on the processor. To ensure architectural integrity, each thread is normally guaranteed access to the entire register set defined by the processor architecture even if the thread only uses a fraction of that register set.

A particular thread's instructions and data, together with the architectural registers that store that data are referred to as a "context". A "context switch" occurs when the architectural resources are switched from one thread to another thread. A context switch occurs, for example, when one thread become inactive or is terminated and the processor resources are applied to another active thread. A context switch also occurs, for example, when an executing thread accesses a resource that has a long latency, or when a thread with higher priority than the current thread is imposed on the processor. When a context switch occurs, the data in the registers is moved out of the registers and saved to persistent storage (or some other memory location). Data for the new context is then transferred into the registers.

One way to organize registers within a processor is to use a register windowing technique to access a plurality of registers in a register file. With register windowing, a register window has a predetermined number of contiguous registers, and the window can be moved linearly within the register file. At any one time, the register window permits program access to a subset of the total number of registers in the register file. Control registers are also associated with the register windows so that a program can manipulate the position of the window within the register file and monitor the status of the window.

For example, in the specification for a scaleable processor architecture, SPARC-V9, the general purpose registers for storing and manipulating data are arranged in register sets accessible through register windows, each register window having 32 registers. A particular processor can have multiple register sets ranging from three register sets to 32 register sets. Individual registers are addressable using a five-bit address in conjunction with a current window pointer (CWP). The register window is movable within the register sets such that a program can logically address multiple physical registers in the register sets by simply tracking a logical register name or specifier and the current window pointer.

In prior implementations, the entire register file is purged in response to a context switch, and the register file is initialized for a new process. If the new process is itself a saved process, the register values are restored from storage before the context takes effect. Because of this, two memory operations, one to write the old context to storage and a second to read the new context from storage, may be required for each context switch. For VLIW architectures, this situation creates an undesirable number of memory transactions that constitute overhead to the fundamental data processing performance of the processor. For example, in an architecture providing 256 registers, up to 512 memory transactions may be required to implement a context switch. This setup may be required in prior systems even where only a few of the 256 registers were actually used by the current process and where only a few of the registers will be used by the new process. A need exists for a processor architecture that provides low overhead manipulation of a large register file.

Another limitation of existing processors is that during a context switch, all of the processors resources are dedicated to completing the context switch. Other operations are blocked until the new context is in place. This type of operation decreases the efficiency of the processor because every operation is stalled until all of the old context's registers are saved (including registers that were not used) and all of the new context's registers are initialized or restored (including registers that will not be used).

SUMMARY OF THE INVENTION

Briefly stated, the present invention solves these and other limitations by saving only registers that have been modified in response to a context switch. Further, during a context switch, the new context's registers are dynamically loaded from its context record when the register is used. In this manner, no overhead penalty is incurred for registers that are architecturally specified, but not used by the thread. Also, the context saving process is performed in accordance with the present invention in parallel with other operations in the new context, minimizing the impact of context switching on processor performance.

In another aspect, the present invention involves a method for operating a processor including the steps of establishing a first register save area and a second register save area in a memory, where each register save area holds data values that define a context. The first context is loaded in the processor by loading at least some of the data values from the first register save area into the plurality of registers. A first pointer value to the first register save area is stored in a current RFSA register. A context switch is indicated by storing a second pointer to the second register save area in the current RFSA register. The first pointer is transferred from the current RFSA register to a previous RFSA register. All of the data values that define the first context are transferred from the registers to a shadow register file. The second context is established in the processor by loading selected data values from the second register file save area into the plurality of registers.

DETAILED DESCRIPTION OF THE PREFERRED EMBODIMENTS

Figure 1:
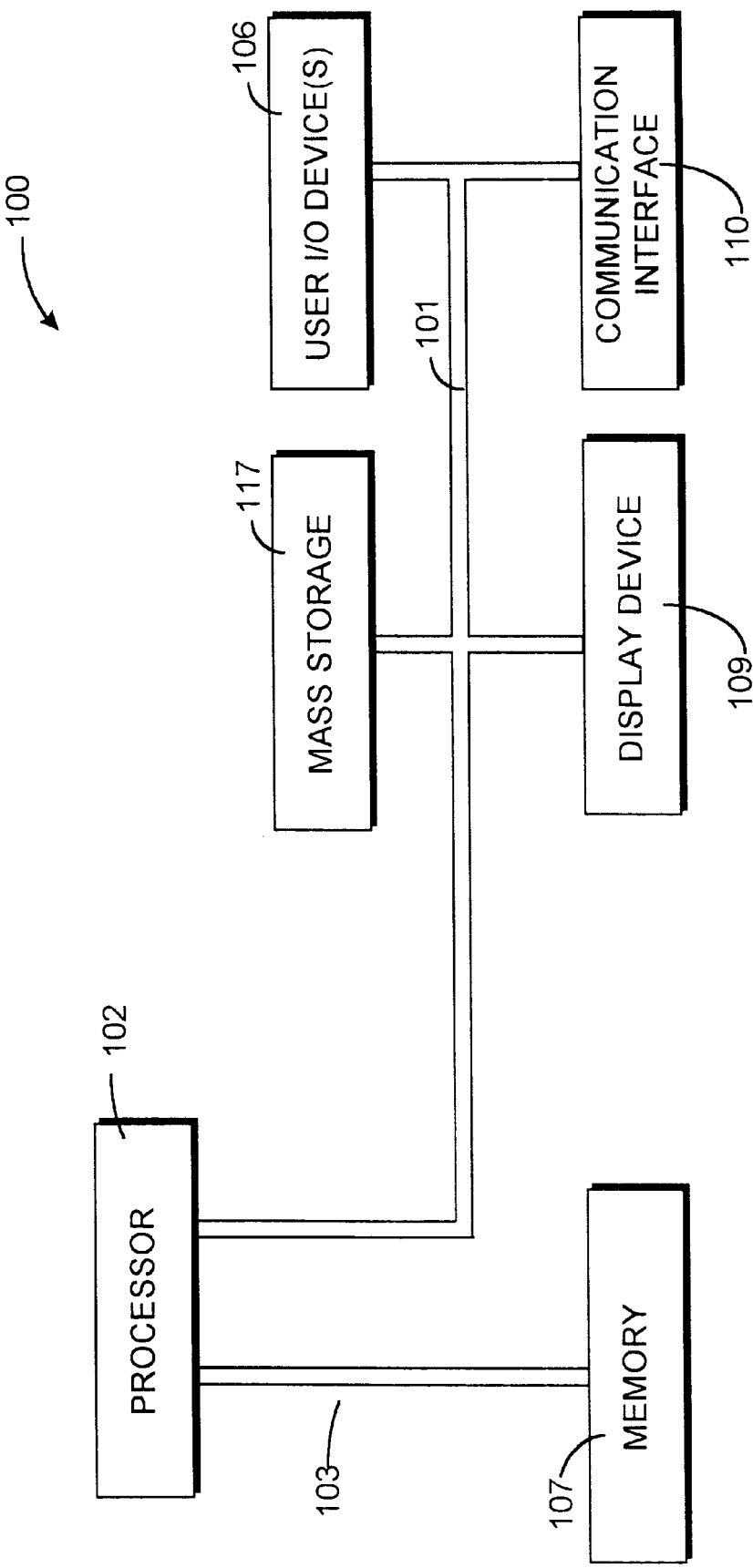
FIG. 1 shows in block diagram form a computer system implementing context switching in accordance with the present invention.

FIG. 1 illustrates in block diagram form a computer system incorporating an apparatus and system in accordance with the present invention. Processor architectures and computing systems are usefully represented as a collection of interacting functional units as shown in FIG. 1. These functional units, discussed in greater detail below, perform the functions of fetching instructions and data from memory, processing fetched instructions, managing memory transactions, interfacing with external I/O and displaying information.

The present invention is described in terms of an apparatus and method particularly useful in a computer system 100 such as shown in FIG. 1. FIG. 1 shows a typical general purpose computer system 100 incorporating a processor 102 and implementing both an application program and an operating system executing in processor 102. Computer system 100 in accordance with the present invention comprises a system bus 101 for communicating information, processor 102 coupled with bus 101 through input/output (I/O) devices within processor 102. Processor 102 is coupled to memory system 107 using a memory bus 103 to store information and instructions for processor 102. Memory system 107 comprises, for example, one or more levels of cache memory and main memory in memory unit 107. It should be understood that some cache memory is included on-chip with processor 102 in most applications in addition to cache and memory in memory system 107.

User I/O devices 106 are coupled to bus 101 and are operative to communicate information in appropriately structured form to and from the other parts of computer 100. User I/O devices may include a keyboard, mouse, magnetic or tape reader, optical disk, or other available I/O devices, including another computer. Mass storage device 117 is coupled to bus 101 and may be implemented using one or more magnetic hard disks, magnetic tapes, CD ROMs, large banks of random access memory, or the like. A wide variety of random access and read-only memory technologies are available and are equivalent for purposes of the present invention. Mass storage 117 includes computer programs and data stored therein. Some or all of mass storage 117 may be configured to be incorporated as part of memory system 107. Processor 102 includes a number of registers 203 (shown in FIG. 2) that are typically implemented in hardware. Data processing occurs by loading data into registers 203, modifying data in registers 203, and storing data from registers 203 back out to memory 107

A processor 102 with a large general register file 202 (e.g., 256 registers) carries with this the potential for 512 memory operations on a context switch. Many of these will be unnecessary and so may lengthen the context switch time considerately. The present invention seeks to reduce this time by only loading and saving registers that are in fact needed, and to perform the saving operations in parallel with other instructions.

Figure 2:
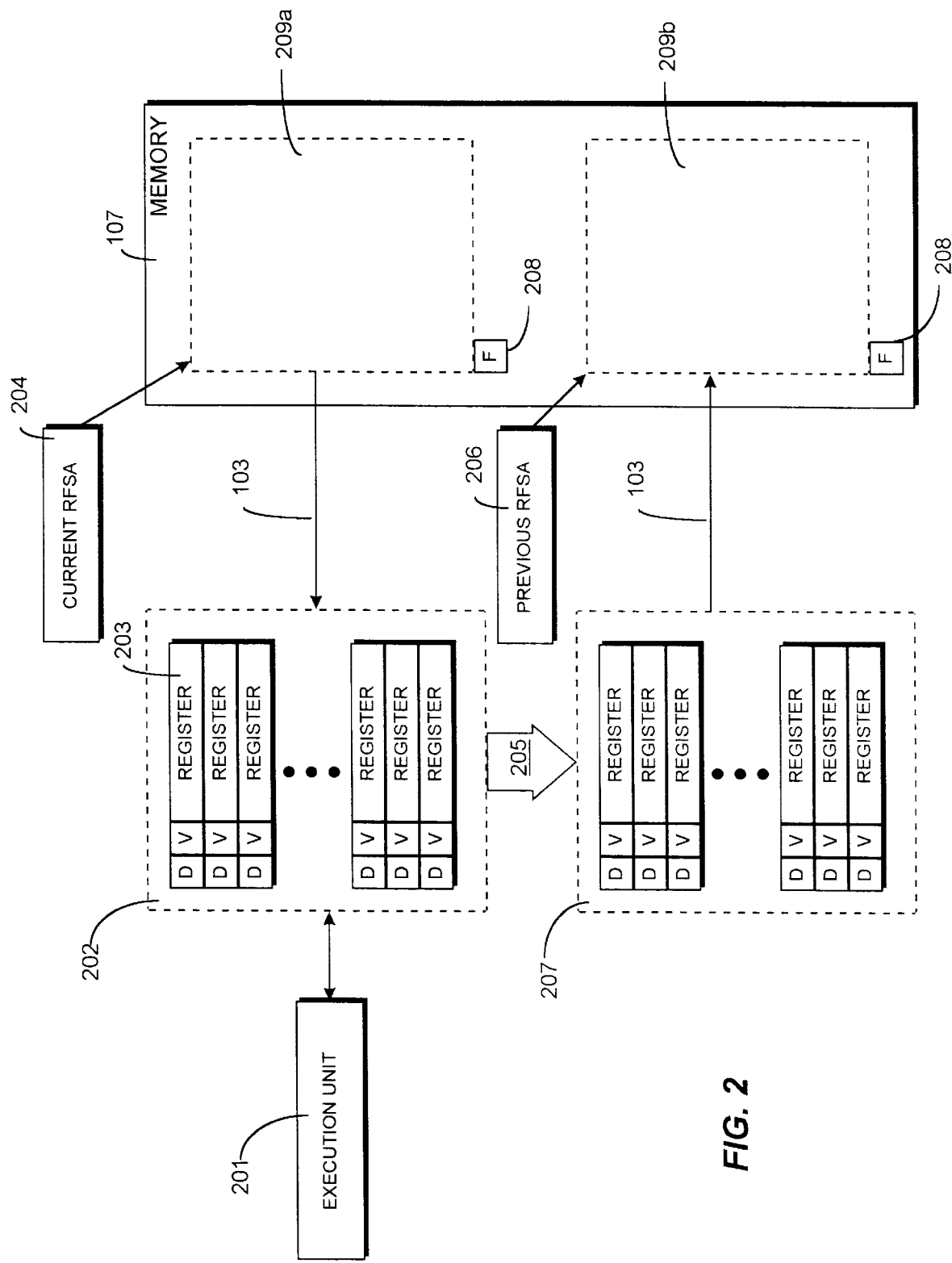
FIG. 2 shows in block diagram form components of a context switching apparatus in accordance with the present invention.

Referring to FIG. 2, an execution unit 201 within processor 102 accesses (i.e., loads, stores, and modifies) data stored in general register file 202. General register file 202 comprises a plurality of registers 203 where the number of registers 203 is specified by the processor architecture. Each register 203 includes at least one, and typically more than one storage cell(s) each storing one bit of information. The registers 203 in general register file 202 are alternatively referred to as "architectural" register files. Each register 203 is accessible by execution unit 201 to enable processor 102 to load data from a selected register 203 and store data to a selected register 203.

The contents of registers 203 in aggregate define a "context" or the processor state during execution of a particular program thread or process. The context is saved persistently in memory 107 in a register save area 209a or 209b so that it can be restored on demand. Although only two register save areas 209a and 209b are shown, each context has a corresponding save area 209. Hence, there may be hundreds or thousands of register save areas 209.

As shown in FIG. 2, a current register file save area (RFSA) register 204 contains data pointing to an area of memory 107 where the current thread's register values are saved. The term "current thread" means a program thread currently executing in execution unit 201. In a particular example, RFSA 204 contains a pointer to a start location or first memory location of a sequentially block of memory holding all of the values from registers 203. Where the number of registers 203 in register file 202 is specified by the processor architecture, only the first register address is needed to access all of the registers 203 individually. Alternatively, the register values can be accessed from memory 107 in groups comprising some but less than all of the registers. A new value is written into current RFSA register 204 at the initiation of a context switch.

In accordance with the present invention, each of registers 203 include or is associated with a valid bit (labeled "V" in FIG. 2) indicating whether data of the register is effective data or not. When current RFSA register 204 is written to, indicating a context switch, all the general registers 203 are marked as invalid. If a register 203 is written to when in the invalid state the associated valid bit is then marked valid.

When a register 203 is read while in the invalid state, processor 102 automatically loads the value from the register file save area 209a of memory 107. When the value is loaded, the corresponding valid bit is marked valid. Each register 203 is also associated with a dirty bit (labeled "D" in FIG. 2) that indicates that the value stored in the register file save area of memory 107 for that register 203 is out of sync with the current register 203. Registers having a dirty bit set are referred to herein as "dirty registers".

When current RFSA register 204 is written to (indicating a context switch) its current value is copied to previous RFSA register 206. Previous RFSA register 206 is, for example, coupled to current RFSA register 204 to receive the copied current RFSA value. Also, the value in all registers 203 are copied, preferably in one cycle, into shadow register file 207 over local register connection 205. In practice, shadow register file 207 may be implemented in a fashion so that each memory cell or storage location in each register 203 is physically adjacent to a corresponding memory cell or storage location in shadow register file 207. In this manner, memory bus 103 is not burdened with the traffic required to copy all of registers 203 during a context switch. The content of each register 203 is copied together with its associated valid bit and dirty bit. Once all the registers 203 have been copied to shadow register file 207, register file 202 can be dedicated to holding entries from the new context.

As there are unused cycles on the memory bus 103 registers values stored in shadow register 207 that are dirty as indicated by the dirty bit are written to the register save area 209b in memory 107 using memory bus 103 at a location described by or derived from the value held in previous RFSA 206. This "lazy" write back or commit of the register values in shadow register 207 makes efficient use of memory bus 103 and the available memory bus cycles. This function may be implemented without added processor instructions by hardware coupled to current RFSA register 204 to detect a change in current RFSA 204 value and coupled to shadow register 207 to detect whether any dirty bits are set in shadow register 207.

When a context switch occurs, two cases may exist. In a first case, if the value of the new context in current RFSA 204 is the same as the value in the previous RFSA 206, the register values in shadow register 207 and register file 202 can be swapped. In this case, it is not necessary to complete write back of all dirty registers in shadow register 207 to register save area 209b. To enable swapping of the register values in may be desirable to include a third register file to temporarily hold the contents during swapping, although other hardware mechanisms to implement this swapping will be apparent to those skilled in the design of memory and processor systems.

In the second case, the value of the new context identified by the value stored in current RFSA 204 is different from the value in previous RFSA register 206. In this case, all the registers having dirty bits currently set in shadow 207 (if any exist) must be saved to register save area 209b in memory 107 before the context switch takes place. In most applications, all of the dirty registers in shadow register 207 will have already been written back in free memory cycles. However, in applications where context switches occur without sufficient memory cycles to complete the write back, a forced write back is required. If the operating environment is such that frequent context switches occur with insufficient free memory clock cycles to complete the write back of dirty registers in shadow 207, it may be desirable to steal memory cycles from the memory bus. The stolen memory cycles will impact normal operation, but will allow dirty registers in shadow register 207 to be completely written back before a subsequent context switch, resulting in a net improvement.

In most environments the write back of data from shadow register 207 to memory 107 will only write into a data cache. In uniprocessor environments it is acceptable for the contents of RFSA 209b to be held in cache because the processor can readily access cached data. However, in SMP environments, all contents of shadow register 207 having the dirty bits set must eventually be written to memory 107 so that the data is available to other processors in the SMP system. To ensure that all the registers 203 are eventually written out to memory 107, it may be necessary to force a cache write-back operation by issuing a commit instruction from time to time that writes all register values stored in cache to main memory. This commit instruction may be issued periodically or based upon elapsed time that the data has been in shadow register 207, or frequency of context switches, other equivalent criteria, or a combination of these criteria.

In a preferred implementation, the new register values are loaded over memory bus 103 as needed from the associated register save area 209a in memory 107 to register file 202 using the new value stored in current RFSA register 204. This is alternatively referred to as a "lazy" restore, a "dynamic" restore, or a "just-in-time" restore. This is in contrast to existing systems that load the values into all of registers 203 before beginning to process data stored in register file 202. As described hereinbefore, upon a context switch, the valid bits of each register 203 are marked invalid. As execution unit 201 requests data for the first time from a register 203, the value is automatically loaded from memory 107 (because the register 203 is marked invalid) . Some delay can be added to the instruction execution until the restored data is ready. Until the data from a particular register is requested, it remains in main memory (or cache). This dynamic restore feature of the present invention saves memory bus cycles that are ordinarily used to transfer register values that are not used by the executing thread.

Because register entries are dynamically loaded on use, the registers that are loaded are available for use very quickly, without the latency normally associated with restoring the entire register file 202. Hence, the dynamic loading feature enables execution unit 201 to process data from registers 203 faster than prior processors. By avoiding the latency required by restoring the entire register file 202, the processor 102 in accordance with the present invention operates with greater efficiency.

The method in accordance with the present invention carries an added advantage in a symmetric multi-processing (SMP) environment. In an SMP environment, a thread from a single threaded program may execute on different processors, each having distinct register file 202. In these cases a CPU may attempt to execute a task that has not finished having its registers written back to memory on another CPU.

In the prior art, this problem could be handled in three ways: 1) save the registers 203 at every context switch and just perform the lazy restore; 2) bind the switched out thread to the processor upon which it was executed and which holds its shadow register 207; and 3) interrupt the processor having the shadow register 207 and force that processor to write the shadow register 207 to it associated register save area 209b in memory. All of these have disadvantages, but in accordance with a preferred embodiment of the present invention, shadow register file 207 will automatically synchronize with its associates register save area 209b given sufficient time (i.e., sufficient available memory cycles) . Each register file save area desirably includes a flag 208 comprising a single bit to show that synchronization is complete (i.e., all registers in shadow register file 207 having a dirty bit have been written back to memory 107. This bit flag 208 can be tested by a processor 102 that request to load the context stored in shadow register 207.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. A computer system including a processor and a memory, the computer system comprising:
   a general register file including a plurality of general registers holding data, each of the plurality of general registers having one or more register information bits associated with it;
   an execution unit within the processor operable to access data from selected general registers;
   a first register save area located at an address in the memory, the first register save area storing data held in the plurality of registers;
   a current register file save area register holding a value pointing to the location of the first register save area in memory;
   a shadow register file coupled to receive data from the general register file and to send data to the memory, the shadow register file having an entry for each of the general registers;
   a second register save area located at an address in the memory, the second register save area storing data held in the shadow register file; and
   a previous register file save area register coupled to the current register file save area register and holding a value pointing to the location of the second register save area in memory.

2. The computer system of claim 1 wherein the general register file holds data for one of a plurality of contexts.

3. The computer system of claim 1, wherein the one or more register information bits of each of the plurality of general registers includes a valid bit indicating whether data of the associated general register is effective data.

4. The computer system of claim 1, wherein the one or more register information bits of each of the plurality of general registers includes a dirty bit indicating whether data of the associated general register is synchronized with data corresponding to the associated general register in the register save area.

5. The computer system of claim 4 further comprising:
   a flag associated with each general register save area, wherein the flag indicates when all values in the register save area are synchronized.

6. The computer system of claim 1 further comprising a memory bus coupling the plurality of general registers to the memory.

7. The computer system of claim 6 further comprising a register bus separate from the memory bus coupling the general register file to the shadow register file.

8. The computer system of claim 1 further comprising a register bus coupling the general register file to the shadow register file wherein each general register comprises a plurality of one-bit storage locations and the register bus comprises a connection from each storage location in the general register file to a, corresponding storage location in the shadow register file to enable the data held in all of the plurality of registers to be transferred to the shadow register file in a single clock cycle.

9. The computer system of claim 1 further comprising:
   a memory bus coupling the plurality of general registers to the memory, wherein the shadow register file sends data to the memory using the memory bus while the memory bus is not being used to communicate data between the plurality of registers and the memory.

10. A method for operating a processor having a plurality of registers holding data, each of the plurality of registers having one or more register information bits associated with it, and a memory, the method comprising the steps of:
    providing a first register save area in the memory, the first register save area holding data values that define a first context;
    providing a second register save area in the memory, the second register save area holding data values that define a second context;
    providing the first context in the processor by loading at least some of the data values from the first register save area into the plurality of registers and by maintaining the one or more register information bits associated with each of the plurality of registers;
    storing a first pointer value which points to the first register save area in a current RFSA register;
    indicating a context switch by storing a second pointer to the second register save area in the current RFSA register;
    transferring the first pointer from the current RFSA register to a previous RFSA register;
    transferring substantially all of the data values that define the first context from the registers to a shadow register file; and
    providing the second context in the processor by loading selected data values from the second register file save area into the plurality of registers and by maintaining the one or more register information bits associated with each of the plurality of registers.

11. The method of claim 10 further comprising the step of:
    providing a plurality of register file save areas in the memory wherein each register file save area holds data values that define a unique context.

12. The method of claim 11 wherein the first register file save area and the second register file save area are selected from the plurality of register file save areas by a thread executing on the processor.

13. The method of claim 10 wherein the step of transferring substantially all of the data values further comprises the step of:
    copying each stored bit in the data values that define the first context to a corresponding bit storage location in the shadow register in a single memory cycle.

14. The method of claim 10, further comprising the step of:
    marking each of the plurality of registers with a valid bit of the one or more register information bits associated with the register indicating whether the data of the register is effective data.

15. The method of claim 10, further comprising the step of:
    marking each of the plurality of registers with a dirty bit of the one or more register information bits associated with the register indicating whether the data of the register is synchronized with data in its corresponding register file save area.

16. The method of claim 10 further comprising the step of:
    marking each register save area with a flag indicating whether substantially all values in the register file save area are synchronized.

17. A computer program product for use with a general purpose computer, said computer program product comprising:
- a computer usable medium having computer readable program code means embodied in said medium for operating a processor having a plurality of registers holding data and a memory, the computer program product having:
- computer readable program code devices for causing a computer to provide a first register save area in the memory, the first register save area holding data values that define a first context;
- computer readable program code devices for causing a computer to provide a second register save area in the memory, the second register save area holding data values that define a second context;
- computer readable program code devices for causing a computer to provide the first context in the processor by loading at least some of the data values from the first register save area into the plurality of registers;
- computer readable program code devices for causing a computer to store a first pointer value to the first register save area in a current RFSA register;
- computer readable program code devices for causing a computer to indicate a context switch by storing a second pointer to the second register save area in the current RFSA register;
- computer readable program code devices for causing a computer to transfer the first pointer from the current RFSA register to a previous RFSA register;
- computer readable program code devices for causing a computer to transfer all of the data values that define the first context from the registers to a shadow register file; and
- computer readable program code devices for causing a computer to provide the second context in the processor by loading selected data values from the second register file save area into the plurality of registers.

18. A computer system including a processor and a memory, the computer system comprising:
- a general register file including a plurality of general registers holding data;
- an execution unit within the processor operable to access data from selected general registers;
- a first register save area located at an address in the memory, the first register save area storing data held in the plurality of registers;
- a current register file save area (RFSA) register holding a value pointing to the location of the first register save area in memory;
- a shadow register file coupled to receive data from the general register file and to send data to the memory, the shadow register file having an entry for each of the general registers;
- a second register save area located at an address in the memory, the second register save area storing data held in the shadow register file;
- a previous register file save area (RFSA) register coupled to the current register file save area register and holding a value pointing to the location of the second register save area in memory; and
- a control connection between the shadow register file, the current RFSA register and the previous RFSA register, wherein the shadow register file is further coupled to send data to the plurality of registers in response to detecting that the current RFSA value equals the previous RFSA value.

19. A method for operating a processor having a plurality of registers holding data and a memory, the method comprising the steps of:
- providing a first register save area in the memory, the first register save area holding data values that define a first context;
- providing a second register save area in the memory, the second register save area holding data values that define a second context;
- providing the first context in the processor by loading at least some of the data values from the first register save area into the plurality of registers;
- storing a first pointer value which points to the first register save area in a current RFSA register;
- indicating a context switch by storing a second pointer to the second register save area in the current RFSA register;
- transferring the first pointer from the current RFSA register to a previous RFSA register;
- transferring substantially all of the data values that define the first context from the registers to a shadow register file; and
- providing the second context in the processor by loading selected data values from the second register file save area into the plurality of registers on a register by register basis as needed by a thread executed on the processor.

20. A method for operating a processor having a plurality of registers holding data and a memory, the method comprising the steps of:
- providing a first register save area in the memory, the first register save area holding data values that define a first context;
- providing a second register save area in the memory, the second register save area holding data values that define a second context;
- providing the first context in the processor by loading at least some of the data values from the first register save area into the plurality of registers;
- storing a first pointer value which points to the first register save area in a current RFSA register;
- indicating a context switch by storing a second pointer to the second register save area in the current RFSA register;
- transferring the first pointer from the current RFSA register to a previous RFSA register;
- transferring substantially all of the data values that define the first context from the registers to a shadow register file; and
- providing the second context in the processor by: (1) loading selected data values from the second register file save area into the plurality of registers; (2) marking each of the plurality of registers with a valid bit indicating whether the data of the register is effective data; (3) setting each of the valid bits to indicate that the data is not effective data; (4) each time a register is accessed, retrieving data from the accessed register if the valid bit indicates that the data is effective; and (5) each time a register is accessed, retrieving data from the register file save area if the valid bit indicates that the data is not effective, filling the register with the retrieved data, and setting the valid bit for the register to indicate that the register's data is now effective.

21. The computer system of claim 1, wherein each of the one or more register information bits is included in its respective general register.

22. The method of claim 11, wherein each of the one or more register information bits is maintained in its respective register.

* * * * *

UNITED STATES PATENT AND TRADEMARK OFFICE
CERTIFICATE OF CORRECTION

PATENT NO. : 6,408,325 B1
DATED : June 18, 2002
INVENTOR(S) : Nik Shaylor

It is certified that error appears in the above-identified patent and that said Letters Patent is hereby corrected as shown below:

Column 7,
Line 59, delete ","

Signed and Sealed this

Tenth Day of September, 2002

Attest:

Attesting Officer

JAMES E. ROGAN
Director of the United States Patent and Trademark Office